US012025699B2

(12) United States Patent
Davalos et al.

(10) Patent No.: US 12,025,699 B2
(45) Date of Patent: Jul. 2, 2024

(54) WEATHER RADAR SHORT-TERM FORECAST FOR IN-FLIGHT COCKPIT DISPLAYS

(71) Applicant: Honeywell International Inc., Charlotte, NC (US)

(72) Inventors: Pedro Davalos, Plymouth, MN (US); Megan Kohagen, Robbinsdale, MN (US); Michael R. Jackson, Maple Grove, MN (US)

(73) Assignee: Honeywell International Inc., Charlotte, NC (US)

( * ) Notice: Subject to any disclaimer, the term of this patent is extended or adjusted under 35 U.S.C. 154(b) by 366 days.

(21) Appl. No.: 17/507,473

(22) Filed: Oct. 21, 2021

(65) Prior Publication Data

US 2023/0131160 A1 Apr. 27, 2023

(51) Int. Cl.
*G01S 13/95* (2006.01)
*G01S 7/41* (2006.01)

(52) U.S. Cl.
CPC ............. *G01S 13/953* (2013.01); *G01S 7/411* (2013.01); *G01S 7/417* (2013.01)

(58) Field of Classification Search
CPC ......... G01S 13/953; G01S 7/411; G01S 7/417
See application file for complete search history.

(56) References Cited

U.S. PATENT DOCUMENTS

| 8,085,182 | B2 | 12/2011 | Kauffman |
| 8,665,133 | B2 | 3/2014 | Khatwa et al. |
| 9,057,773 | B1 | 6/2015 | Fersdahl et al. |
| 10,048,370 | B2 | 8/2018 | Christianson et al. |
| 10,365,365 | B2 | 7/2019 | Christianson et al. |
| 10,877,150 | B2 | 12/2020 | Badin et al. |
| 10,935,693 | B2 | 3/2021 | Lukas et al. |

(Continued)

FOREIGN PATENT DOCUMENTS

| EP | 2233946 A1 | 9/2010 |
| EP | 2237068 A1 | 10/2010 |

(Continued)

OTHER PUBLICATIONS

Extended Search Report from counterpart European Application No. 22199488.2 dated Feb. 2, 2023, 12 pp.

(Continued)

*Primary Examiner* — Peter M Bythrow
*Assistant Examiner* — Nazra Nur Waheed
(74) *Attorney, Agent, or Firm* — Adrian A. Sanchez; Shumaker & Sieffert, P.A.

(57) ABSTRACT

Improvements to airborne weather radar systems onboard an aircraft that apply forecasting modeling techniques to output a forecast of future 3-dimensional (3D) radar reflectivity returns, forecasted composite radar image data, forecasted changes to potentially hazardous weather cells, including forecasts of future expected hail size and forecast which regions of airspace may be associated with future convective storms. The range of the forecast may be limited to approximately the range of the weather radar, which may be a few hundred nautical miles. Depending on the type and speed of the aircraft, the forecast duration may be approximately thirty minutes or less, e.g., the amount of time to reach the limits of the radar range.

19 Claims, 4 Drawing Sheets

(56) References Cited

U.S. PATENT DOCUMENTS

| | | | |
|---|---|---|---|
| 11,181,634 B1* | 11/2021 | Lue | G06N 3/045 |
| 2009/0177343 A1* | 7/2009 | Bunch | G01S 7/22 |
| | | | 701/14 |
| 2010/0245166 A1 | 9/2010 | Kirk et al. | |
| 2019/0340940 A1* | 11/2019 | Elkabetz | G01W 1/02 |
| 2021/0132220 A1 | 5/2021 | Badin et al. | |
| 2021/0221506 A1 | 7/2021 | Phelan et al. | |

FOREIGN PATENT DOCUMENTS

| | | |
|---|---|---|
| EP | 2267480 A1 | 12/2010 |
| EP | 3293553 A1 | 3/2018 |

OTHER PUBLICATIONS

Xiao et al., "Development of a Neural Network Based Algorithm for Rainfall Estimation from Radar Observations", IEEE Transactions on Geoscience and Remote Sensing, vol. 35, No. 1, Jan. 1997, pp. 160-171.

Wang et al., "Thunderstorm identification algorithm research based on simulated airborne weather radar reflectivity data," Journal on Wireless Communications and Networking, published online Feb. 10, 2020, 18 pp.

Kim et al., "A Data-Driven Approach using Machine Learning to Enable Real-Time Flight Path Planning," ARC, AIAA 2020-2873, published online Jun. 8, 2020, 14 pp.

Response to Extended Search Report dated Feb. 2, 2023, from counterpart European Application No. 22199488.2 filed Mar. 23, 2023, 19 pp.

\* cited by examiner

FIG. 2A
FIG. 2B

WEATHER RADAR SHORT-TERM FORECAST FOR IN-FLIGHT COCKPIT DISPLAYS

TECHNICAL FIELD

The disclosure relates to airborne weather radar systems, and more particularly to weather radar systems configured to display forecasted weather radar images.

BACKGROUND

Flight crews need accurate and timely weather information both pre-flight for planning, and in-flight for continuous assurance of a safe flight path. An aircraft may use an onboard weather radar system to detect adverse weather conditions, which may enable the flight crew to make changes to the flight path as necessary to avoid potentially hazardous weather. Some onboard weather radar displays are able to use past data from radar returns to display the trend information and track vectors based on extrapolating recent determinations.

SUMMARY

In general, the disclosure describes improvements to airborne weather radar systems onboard an aircraft. The techniques of this disclosure include applying forecasting modeling techniques to display a forecast of future full 3-dimensional (3D) radar reflectivity returns, forecasted composite radar image data, forecasted changes to potentially hazardous weather cells, including forecasts of future expected hail size, and a forecast of which regions of airspace may be associated with future convective storms. The range of the forecast may be limited to approximately the range of the weather radar, which may be a few hundred nautical miles. Depending on the type and speed of the aircraft, the forecast duration may be less than approximately thirty minutes, e.g., the amount of time to reach the limits of the radar range.

In one example, this disclosure describes a system comprising a weather radar system on board an aircraft configured to receive a plurality of reflected radar returns over a duration preceding a current time while the aircraft is flying a flight path; processing circuitry operatively coupled to a memory, the processing circuitry configured to: determine digitized three-dimensional (3D) radar reflectivity characteristics of a volume of airspace in a flight path of the aircraft based on the plurality of reflected radar returns over the duration preceding the current time; and analyze the 3D radar reflectivity characteristics for the volume of airspace with a pre-trained neural network-based model; and based on the analysis, output forecasted weather changes to the volume of airspace over a predetermined future duration subsequent to the current time, wherein the forecasted weather changes comprise future 3D radar reflectivity characteristics for the predetermined future duration.

In another example, this disclosure describes a weather radar apparatus on board an aircraft, wherein the weather radar apparatus is configured to receive a plurality of reflected radar returns over a duration preceding a current time while the aircraft is flying a flight path, and the apparatus comprising: processing circuitry operatively coupled to a memory, the processing circuitry configured to: determine digitized three-dimensional (3D) radar reflectivity characteristics of a volume of airspace in the flight path of the aircraft based on the plurality of reflected radar returns over the duration preceding the current time analyze the 3D radar reflectivity characteristics for the volume of airspace with a pre-trained neural network-based model; and based on the analysis, output forecasted weather changes to the volume of airspace over a predetermined future duration subsequent to the current time, wherein the forecasted weather changes comprise future 3D radar reflectivity characteristics, for the predetermined future duration.

In another example, this disclosure describes a method that includes receiving, by a weather radar system on board an aircraft, a plurality of reflected radar returns over a duration preceding a current time while the aircraft is flying a flight path determining, by processing circuitry operatively coupled to a memory, digitized three-dimensional (3D) radar reflectivity characteristics of a volume of airspace in a flight path of the aircraft based on the plurality of the reflected radar returns from the weather radar system over the duration preceding the current time; analyzing, by the processing circuitry, the 3D radar reflectivity characteristics for the volume of airspace with a pre-trained neural network-based model; and based on the analysis, outputting an electronic signal comprising forecasted weather changes to the volume of airspace over a predetermined future duration subsequent to the current time, wherein the forecasted weather changes comprise future 3D radar reflectivity characteristics for the predetermined future duration.

The details of one or more examples of the disclosure are set forth in the accompanying drawings and the description below. Other features, objects, and advantages of the disclosure will be apparent from the description and drawings, and from the claims.

BRIEF DESCRIPTION OF DRAWINGS

FIGS. 2A and 2B are conceptual diagrams illustrating an example of the weather forecast unit determining a future state of observed weather phenomena based on 3D volumetric weather data collected up to a present time.

DETAILED DESCRIPTION

Figure 1:
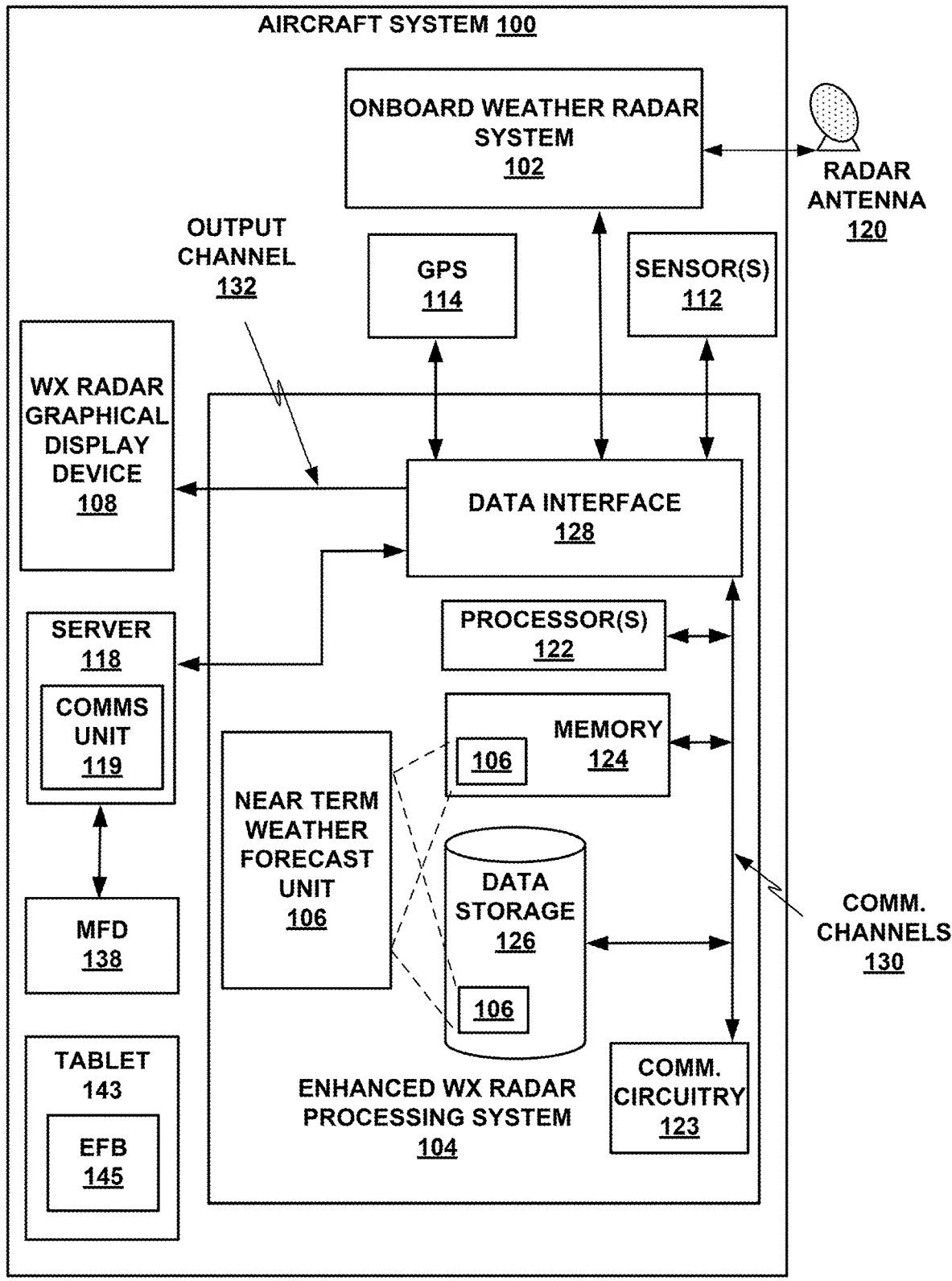
FIG. 1 is a block diagram illustrating an airborne system configured to display a weather forecast based on received weather radar data.

The disclosure describes an airborne weather radar system configured to display a forecast of future full 3-dimensional (3D) radar reflectivity returns, forecasted composite radar image data, forecasted changes to potentially hazardous weather cells, including forecasts of future expected hail size, and a forecast of which regions of airspace may be associated with future convective storms. The system may perform repeated scans of a volume of airspace and correlate radar scan return signals with 3D positions within the volume of airspace to generate and store 3D volumetric weather radar data that corresponds to the 3D volume of airspace. The system of this disclosure may apply forecast modeling techniques to the 3D volumetric weather data stored at a memory location of the radar system to produce the forecasted information for the flight crew. In some examples, a flight crew may switch the display from a depiction of the current radar reflectivity returns and predicted hail, to a forecasted display of future radar reflectivity returns and future location and size of hail.

The range of the forecast may be limited to approximately the range of the weather radar, which may be a few hundred nautical miles. Depending on the type and speed of the aircraft, the forecast duration may be short-term, e.g., less than approximately thirty minutes, which may be the amount of time to reach the limits of the radar range, or to reach the selected 3D volume of airspace. In some examples, the forecasted information may be used to display a suggested alternative flight path to avoid potential hazardous weather.

Unlike the system of this disclosure, some ground-based weather forecasting systems may use computationally intensive processes that require very large amounts of data and significant computing resources to process physics-based, numerical weather models. These traditional approaches are prohibitive for in-flight/onboard applications because of limited data and processing power available onboard an aircraft. In contrast, the weather radar system of this disclosure may provide advantages over ground-based forecasting by use of a data-driven convolutional neural network-based model, or other similar machine learning models, to enable an efficient and effective short-term onboard forecasting during flight. The weather radar system of this disclosure, which includes forecasting capability, may be installed on either manned aircraft, or unmanned aerial vehicles (UAV).

The onboard and in-flight nature present a unique challenge for weather forecasting when limited to using onboard radar sensors because of the limited range of the radar sensor and the fast velocity of some commercial and military aircraft. Applying the forecast modeling techniques to the 3D volumetric radar data generated by the radar system of this disclosure, may provide a display of the future state of detected weather as the weather cells move, dissipate, and/or increase. The onboard weather forecast may provide more accurate and useful information to the flight crew, and therefore improve on current onboard technology of extrapolating direction and speed of an existing weather cell.

In addition, onboard forecast modeling based on radar reflectivity data that is a few seconds old may provide significant advantages compared to up-linking ground-based or satellite-based forecasts. The weather depicted by the computationally intensive ground-based forecasts may be ten or more minutes delayed compared to the actual weather situation in the volume of airspace through which the aircraft is traveling. For some commercial and military aircraft that travel approximately 450 to 500 knots, a fifteen minute delay means a travel distance of over hundred nautical miles. Also, up linking the data may consume significant communication bandwidth and may be degraded by weather, distance, and other factors. In this manner, the onboard forecast modeling and display of system of this disclosure may be more desirable than other techniques because, for example, the flight crew may have timely and accurate information to change the flight path of their aircraft away from hazardous weather, thereby promoting fuel efficiency, hazard avoidance, and shorter flights for on-time performance.

In addition, the onboard weather radar system of this disclosure may provide advantages over dual-polarized weather radar. Dual-polarization radar devices can use differential reflectivity, cross-correlation, and/or specific differential phase to determine the presence of ice crystals. However, dual-polarized weather radar may not be compatible with existing systems and might require radome changes for its installation. Dual-polarized radar is also more expensive since the processor needs to be capable of processing both polarizations simultaneously.

FIG. 1 is a block diagram illustrating an airborne system configured to display a weather forecast based on received weather radar data. Example aircraft system 100 may include an enhanced weather radar processing system 104 that performs enhanced weather radar mapping, in accordance with example aspects of this disclosure. Example aircraft system 100 includes an onboard weather radar system 102, enhanced weather radar processing system 104 including weather forecast unit 106, a weather radar graphical display device 108, sensors 112, which may include an exterior temperature sensor, and a GPS unit 114. Enhanced weather radar processing system 104 may evaluate weather radar data from onboard weather radar system 102 to determine whether the weather radar signal includes data that indicates the presence of convective weather and/or a bright band effect.

Enhanced weather radar processing system 104 with weather forecast unit 106 may also combine an evaluation of temperature data from temperature sensor 112 and altitude data from, e.g., GPS unit 114, and other onboard sensors (not shown in FIG. 1) with the weather radar data from onboard weather radar system 102 to determine whether the combined data indicates the presence of hazardous weather such as lightning or hail. Enhanced weather radar processing system 104 may also evaluate the data it receives to detect attenuated or absent data (e.g., via attenuation from intervening weather or failure to update data). When enhanced weather radar processing system 104 determines that the weather radar signal does include falsely exaggerated or falsely minimized hazard indications, then the one or more processors 122 of enhanced weather radar processing system 104 may correct for those falsely exaggerated or falsely minimized hazard indications in the weather radar data, and then output a corrected weather data map.

Near-term weather forecast unit 106 may further improve the functioning of enhanced weather radar processing system 104 by applying forecast modeling techniques to 3D volumetric weather data stored at a memory location of enhanced weather radar processing system 104, e.g., memory 124 and or data storage 126. In some examples, memory 124 may include data storage 126. In other words, processing circuitry of enhanced weather radar processing system 104, e.g., processors 122, operatively coupled to memory 124, may execute the modeling techniques on the data received from onboard weather radar system 102. As described above, the stored data may include 3D volumetric weather radar data that corresponds to the 3D volume of airspace, along with data from sensors 112, such as air pressure, temperature, altitude, and so on. Onboard weather radar system 102 may perform repeated scans of a volume of airspace and correlate radar scan return signals with 3D positions within the volume of airspace to develop the stored 3D volumetric weather radar data. In other words, the 3D volumetric weather radar data of a selected volume of airspace in the flight path of the aircraft may be based on the plurality of reflected radar returns over the duration preceding the current time.

System 100 may collect the 3D volumetric weather radar data as a sequence of scanned returns over less than a second, or the system may collect weather radar data for a duration of several seconds or several minutes. The various durations that the system collects data for analysis need not be equal durations. The weather radar system of this disclosure may build the 3D weather radar picture over time as the aircraft travels along the flight path. In some examples, system 100 may continue to scan and receive radar returns to build the 3D weather radar picture of a selected volume of airspace in the memory as the aircraft moves toward the selected volume of airspace.

Processors 122 may analyze the collected 3D radar reflectivity characteristics of the selected the volume of airspace, for example by using a neural network-based model, or other similar machine learning models. The machine learning model may be pre-trained before deployment to the aircraft, which may efficiently use processing power available on the aircraft, e.g., when compared with computationally intensive numerical modeling. Based on the analysis, processors 122 may output forecasted weather changes to the volume of airspace for a predetermined duration subsequent to the current time. Processors 122 may output the displayed forecasted weather changes that include future 3D radar reflectivity, composite radar information, forecasted lightning and hail size for the predetermined duration. The predetermined duration may be a short term, i.e., a near term forecast of, for example less than approximately thirty minutes. As described above, the duration of the forecast may be based on the range of onboard radar system 102 and the speed of the aircraft.

The example of FIG. 1 depicts aircraft system 100 as separated into several functional blocks to simplify the description. In other examples, the weather forecasting functions and enhanced weather analysis functions of aircraft system 100 may be implemented in a variety of ways, which may not be depicted in FIG. 1. In some examples, onboard weather radar system may include the components of enhanced weather radar processing system 104. The processing circuitry of onboard weather radar system 102 may perform all the functions described for processors 122 and weather forecast unit 106. In other examples, enhanced weather radar processing system 104 may be implemented as a stand-alone, self-contained device that connects to onboard weather radar system 102. In other examples, the functions of enhanced weather radar processing system 104, may be implemented by other aircraft based processing circuitry. In some examples, weather forecast unit 106 may be implemented with its own processing circuitry and connected to enhanced weather radar processing system 104. In other examples, weather forecast unit 106 may be implemented as programming instructions stored at a memory location of enhanced weather radar processing system 104, e.g., memory 124 and/or data storage 126, as shown in FIG. 1 and executed by processors 122.

Weather forecast unit 106 may be implemented as one or more executable software applications, modules, libraries, or one or more portions thereof, that may be stored on data storage 126 and/or loaded onto memory 124 and executed by one or more processors 122, in some examples. Weather forecast unit 106, and other functions of enhanced weather radar processing system 104, may also be implemented at least in part with specialized processing hardware such as one or more graphical processing units (GPUs), one or more field-programmable gate arrays (FPGAs), one or more systems on a chip (SoCs), or other type of processing hardware, potentially in combination with executable software or firmware. In this disclosure enhanced weather radar processing system 104 may also be referred to as a weather radar apparatus or a weather radar device. Because the functions of enhanced weather radar processing system 104 may be included in onboard weather radar system 102, onboard weather radar system 102 may also be referred to as a weather radar apparatus or a weather radar device.

In some examples, weather radar forecast unit 106 may generate a forecast of expected weather phenomena and output the forecast, to be consumed by some other process for display or presentation to the pilots/flight crew. In the example of FIG. 1, onboard weather radar system 102 is connected to a weather radar antenna 120. Enhanced weather radar processing system 104 includes one or more processor(s) 122, one or more memory devices 124, one or more data storage devices 126, and a data interface 128. Enhanced weather radar processing system 104 also includes communication channels 130 and output channel 132, such that communication channels 130 are configured to convey data between one or more processors 122, one or more memory devices 124, one or more data storage devices 126, and data interface 128, and so on. Output channel 132 is configured to communicate outputs from enhanced weather radar processing system 104, such as to weather radar graphical display device 108.

In some examples, communication channels 130 may also be coupled to communication circuitry 123 configured to receive off-board weather information, from sources other than the onboard sensors 112, weather radar system 102 and so on. In other examples, aircraft system 100 may receive the off-board weather data via communications unit 119 in addition to or instead of information received by communication circuitry 123. Communication circuitry 123 may receive the off-board weather information via ground based communication, e.g., ADS-B broadcast, satellite communication and from other aircraft. In some examples, communication circuitry 123 of enhanced weather radar processing system 104 may receive weather data from other aircraft via an off-board data aggregating system (not shown in FIG. 1) or directly from the other aircraft (not shown in FIG. 1), e.g., via a datalink. The data aggregating system may be ground-based in some examples and receive enhanced weather mapping data from other aircraft, e.g., in the vicinity of the volume of airspace ahead of the aircraft (not shown in FIG. 1) that has aircraft system 100 installed onboard. Processors 122 may include the off-board weather information as inputs to the neural network-based model, or other similar machine learning model, executed by processors 122 to generate forecasted weather in the volume of airspace. In other words, processors 122 may also analyze the off-board weather data to output the forecasted weather.

As noted above, uplinking data from ground stations, or other aircraft, may be slow, may be delayed, and may consume expensive bandwidth that may interfere with other data uplink functions. However, combining the techniques of this disclosure with other techniques that collect off-board weather data, may provide advantages when compared to other systems. For example, combining the techniques of this disclosure with other techniques may reduce the amount of off-board data needed to fill in gaps in a weather situational awareness. For example, gaps may be caused by distant weather phenomena obscured by closer weather phenomena, or weather that is out of range of the onboard weather radar.

As shown in the example of FIG. 1, onboard weather radar system 102 is operatively connected to enhanced weather radar processing system 104, such as through a data channel between onboard weather radar system 102 and data interface 128 of enhanced weather radar processing system 104. Enhanced weather radar processing system 104 is operatively connected to weather radar graphical display device 108, such as through output channel 132, such that enhanced weather radar processing system 104 may generate two-dimensional weather maps and communicate the two-dimensional weather maps to weather radar graphical display device 108.

Enhanced weather radar processing system 104 may perform suppression of spurious hazard indications for other forms of high-reflectivity stratiform weather and may incorporate indications of hazardous weather from secondary techniques where the initial weather radar data fails to indicate the severity of a hazard or is missing updated data. Functions of enhanced weather radar processing system 104 may be implemented at least in part as, or include, one or more executable applications, application modules, libraries, classes, methods, objects, routines, subroutines, firmware, and/or embedded code, for example.

Examples of processors 122 may include any one or more of a microcontroller (MCU), e.g. a computer on a single integrated circuit containing a processor core, memory, and programmable input/output peripherals, a microprocessor (μP), e.g. a central processing unit (CPU) on a single integrated circuit (IC), a controller, a digital signal processor (DSP), an application specific integrated circuit (ASIC), a field-programmable gate array (FPGA), a system on chip (SoC) or equivalent discrete or integrated logic circuitry. A processor may be integrated circuitry, i.e., integrated processing circuitry, and that the integrated processing circuitry may be realized as fixed hardware processing circuitry, programmable processing circuitry and/or a combination of both fixed and programmable processing circuitry. Accordingly, the terms "processing circuitry," "processor" or "controller," as used herein, may refer to any one or more of the foregoing structures or any other structure operable to perform techniques described herein.

Examples of memory 124 and data storage 126 may include any type of computer-readable storage media. include random access memory (RAM), read only memory (ROM), programmable read only memory (PROM), erasable programmable read only memory (EPROM), one-time programmable (OTP) memory, electronically erasable programmable read only memory (EEPROM), flash memory, or another type of volatile or non-volatile memory device. In some examples the computer readable storage media may store instructions that cause the processing circuitry to execute the functions described herein. In some examples, the computer readable storage media may store data, such as configuration information, temporary values and other types of data used to perform the functions of this disclosure.

In some examples enhanced weather radar processing system 104 may operate in either forecast display or present time display modes. The flight crew may switch between the display modes to view either forecast weather or present time weather, both of which may be produced by processors 122 based on the 3D volumetric weather radar data collected by onboard weather radar system 102. In other examples, enhanced weather radar processing system 104 may output a signal including both a forecast display and a present time display. The output signal may include a two-dimensional weather map for display, e.g., weather radar graphical display device 108, which the flight crew may condition or modify to enhance certain features, e.g., zoom in or out. The user interface display, e.g., on weather radar graphical display device 108, may receive the signal configure the display to indicate the forecast weather in a different manner than the present time weather, e.g., using different colors, patterns, icon indications, text indications, and so on.

Aircraft system 100 may also include a secondary or auxiliary graphical display device, such as multi-function display MFD 138. In the example of FIG. 1, aircraft system 100 also includes server 118, which has its own communication circuitry, e.g., communications unit 119, which may enable or configure server 118 to communicate with an external data service. MFD 138 may be connected to data interface 128 of enhanced weather radar processing system 104 via onboard server 118. A flight crew member of the aircraft may also operate an electronic flight bag (EFB) 145 executing on, e.g., a tablet computer 143, or a tablet computer 143 executing another display application other than an EFB. MFD 138, tablet 143, and/or weather radar graphical display device 108 may receive (e.g., through a datalink connection via server 118, or through an in-flight WiFi connection of tablet computer 143) the signal including two-dimensional weather map from enhanced weather radar processing system 104. The user, e.g., flight crew member may configure any of the displays above to display forecasted weather, present time weather, and manipulate the display controls to enhance, filter or otherwise emphasize various aspects of the received signal on the display.

As noted above, airborne weather radar systems detect reflectivity of weather associated with precipitation. Onboard weather radar system 102 may measure reflectivity of a radar signal as an electrical quantity related to the percentage of power, normalized for range, returned from the weather being illuminated with a radar transmission emitted by onboard weather radar system 102. Reflectivity is generally related to rate of rainfall or rate of precipitation, though this relation may be complicated or distorted by effects such as attenuation of radar sensitivity to a more distant weather structure by a closer, intervening body of precipitation, or bright band due partially melted hydrometeors when snow falls through a freezing/melting altitude. Snowflakes are typically much larger and much less reflective than raindrops, but partially melted hydrometeors combine the large size of snowflakes with the high reflectivity of rain, such that they may deceptively appear to weather radars as an exaggerated precipitation rate within a relatively narrow altitude range, also known as bright band. Enhanced weather radar processing system 104 of this disclosure may analyze bright band sources or other high-reflectivity sources within the context of vertical columns of precipitation and detect and negate the falsely inflated precipitation rates caused by bright band or other high-reflectivity stratiform weather structures. Throughout this description, suppression of bright band may be generalized to suppression of spurious indications of hazardous weather by anomalously high-reflectivity stratiform weather structures.

Enhanced weather radar processing system 104 of this disclosure may distinguish the relative severity of hazard indications, and correct for negative hazard indications, by incorporating secondary techniques for detecting hazardous conditions such as lightning and hail, and for indicating when radar data is attenuated or missing. For example, an implementation of this disclosure may incorporate temperature data and perform modeling of atmospheric conditions based on the weather radar data, temperature data and information from other sensors 112, to detect and characterize potential for lightning and hail. As noted above enhanced weather radar processing system 104 may further correct for false negative hazard indications from a conventional weather radar output by detecting and indicating when data for a given area is falsely attenuated or is missing due to attenuation by intervening weather or failure to have been updated in one or more most recent weather radar scans.

Near-term weather forecast unit 106 of this disclosure may further improve and enhance the situational awareness of a flight crew by displaying forecasted changes at a future time based on received weather radar data at the present time. For example, enhanced weather radar processing system 104, may predict iced water content level for an airspace volume of interest at a present time based on the stored 3D volumetric weather data. In addition, weather forecast unit 106 may forecast future iced water content levels for the airspace volume of interest for a duration subsequent to the present time.

In other examples, enhanced weather radar processing system 104 may be configured to predict the presence of ice crystals based on temporal variation in reflectivity magnitudes. Onboard weather radar system 102 may receive reflected radar signals over time. The reflected radar signals received at a first time and a second time may represent two consecutive measurements by the weather radar device. In some examples, the system may receive reflected radar signals at additional times (e.g., third, fourth, fifth, etc.). In some examples, onboard weather radar system 102 may scan the field of regard and store data to build the 3D reflectivity characteristics of the selected volume of airspace at times that are a minutes apart, or seconds apart. Processing circuitry, e.g., processors 122, may execute instructions to determine magnitudes of reflectivity based on the reflected radar signals received at the first time and the second time, and additional times. Processors 122 may be configured to predict the presence of ice crystals in a volume of airspace at a present time using the reflectivity magnitudes for the first time and the second time and their difference. In some examples, temporal variation of reflectivity magnitude estimated from more than two consecutive samples may be used. For example, the processing circuitry may determine the temporal variance based on the average temporal variance between consecutive measurements for three or more measurements to predict the presence of ice crystals at the present time. Enhanced weather radar processing system 104, with weather forecast unit 106, may improve on the present time prediction of ice crystals, by providing a forecast of future ice crystals, weather cell changes, lightning and so on in the airspace volume of interest for a duration subsequent to the present time. In some examples, the displayed forecasted weather information may include future locations of high altitude ice crystals (HAIC) and high ice water content (HIWC). In addition to the comparison analysis described above, the machine learning model, e.g., neural network-based model, may perform other types of analysis to generate the forecast for the selected volume of airspace.

The weather forecasting features of enhanced weather radar processing system 104 solve a previously unrecognized problem. While ground-based weather forecasting using powerful computers executing complex numerical techniques may be a valuable tool, the onboard and in-flight nature present a unique challenge for weather forecasting. In some examples, it may be desirable to limit aircraft weather prediction to using onboard radar sensors, as described above. The limited range of the radar sensor, the fast velocity of aircraft and the limited processing power available onboard present challenges not present in ground-based weather forecasting. In addition, airborne weather radar, and displays for weather radar may be a crowded art space. Improvements, such as the onboard weather forecast unit 106, may provide a significant step forward for situational awareness for a flight crew, and may lead to improved safety, fuel efficiency, reduced emissions, and on-time performance, and an advantage that up to now those skilled in the art may not have appreciated. The fact that the future forecasting features provided by weather forecast unit 106 have not yet been implemented by those skilled in the art is a further indication that such features are inventive and non-obvious over previous onboard weather radar systems.

The forecasting features of enhanced weather radar processing system 104 provide a new principle of operation to airborne weather radar systems, for example by applying machine learning techniques to airborne weather forecasting, based on analysis of 3D volumetric weather radar data. In some examples, forecast modeling may be implemented using machine learning techniques, such as a data-driven convolutional neural network-based model. The forecast model approach, the data (inputs and outputs) and the network model architecture may be adapted and specifically designed for an airborne weather radar application. The output to the display may forecast short-term (approximately 30 minutes or less) 3D radar reflectivity, composite radar data, and hail size forecasts within a small geographical area, e.g., the volume of airspace in front of an aircraft. They system may analyze a limited past history using the 3D radar data, location, e.g., latitude, longitude, and altitude, as well as terrain, temperature and other data from onboard sensors as inputs. In some examples, the neural network model may be configured as a recurrent convolutional neural Network (RCNN) or a long/short-term memory (LSTM) 2-dimensional convolutional neural network (CNN), or similar machine learning and artificial intelligence models.

In some examples, these machine learning models may use large amounts of data for training. In some examples, the prediction model may be trained using emulated onboard radar based on publicly available Multi-Radar/Multi-Sensor (MRMS) data provided by NOAA/National Severe Storms Laboratory. In other examples, the prediction model may also be trained using historical 3D reflectivity data downloaded from many aircraft flights, e.g., where the flight path passed near convective weather. Once trained, for the deployed onboard application in the aircraft, the model will be configured to output short-term weather predictions using the sensor data available on the aircraft.

Some differences of the system of this disclosure, when compared to some ground-based forecasting systems, may include that the ground-based systems developed a model to forecast precipitation rates observed on the ground rather than full 3D radar reflectivities, weather hazards, or hail size forecast estimates. Also, some ground-based systems output a forecast for a longer 8-hour duration based on longer prior observation history of ground-based weather radar returns, for example, 90-minutes. In contrast, weather forecast unit 106 may forecast less than thirty minutes ahead, based on less than about twenty minutes of stored 3D volumetric weather radar observations. In addition, ground based systems analyze larger geographical areas to generate a larger-scale model for weather systems across the country. However, the modeling applied by weather forecast unit 106 may focuses only on what is in range for the volume of airspace that may affect the moving aircraft. Lastly, weather forecast unit 106 is forecasting on a moving vehicle for a constantly shifting radar range while the ground-based systems use a static range.

FIGS. 2A and 2B are conceptual diagrams illustrating an example of the weather forecast unit determining a future state of observed weather phenomena based on 3D volumetric weather data collected up to a present time. FIG. 2A depicts a weather cell in a dissipating stage, while FIG. 2B depicts a weather cell reaching a mature stage. At any stage, weather phenomena that include possible thunderstorms can present challenges to aviation.

Thunderstorms form when a lifting force, such as a cold front, and an unstable atmosphere combine to push humid air aloft. Individual thunderstorm cells go through a life cycle of cumulus, mature, and dissipating stages. During a thunderstorm's lifespan, winds at the surface and aloft may create turbulence many miles from the storm cell. The latent heat released when water vapor in the humid air condenses into clouds and into precipitation supplies most of a thunderstorm's energy.

During the cumulus stage, a thunderstorm's birth, air may rise into a growing cumulus cloud causing turbulent updrafts. A thunderstorm reaches its mature stage when rain, hail, or in rare cases, snow begins to fall. The falling precipitation drags air down, which creates downdrafts. Currents of air that are moving upward, at times faster than 100 mph, may be adjacent to those air currents coming down, and may create turbulence, which can become violent and present a danger to aircraft. When the updrafts fade away, leaving only downdrafts, a thunderstorm has reached its dissipating stage. But a fading thunderstorm may still dangerous because potentially dangerous downdrafts are possible anywhere around a storm, e.g., as far as 20 statute miles or 30 km.

Also, moisture caught in an updraft may cool well below freezing so quickly that the cloud drops water droplets may become supercooled, e.g., remain liquid at temperatures well below freezing (e.g., 0° C. and 32° F.). These supercooled drops may instantly turn into ice when they hit something, such as an airplane's wings or another piece of ice. Supercooled droplets that impact ice crystals can grow into hail. Hail can grow to golf ball sized or larger and may cause damage to aircraft windscreens or other structures. Therefore, forecasts of a future location of hail may be desirable.

When a cumulus cloud becomes a thunderstorm, the storm cell begins creating lightning. Aircraft may be configured to handle lightning strikes while flying, but the presence of lighting may indicate the presence of the storm cell, and the potentially turbulent air and ice. Therefore, forecasts of a future location of lightning may be useful for a flight crew.

In some examples, weather phenomena may include multiple storm cells, such as a multicell cluster or a squall line, which might stretch for a few hundred miles across a planned flight path. A multicell cluster includes more than one thunderstorm cell in what might look like a single storm. Such a cluster may include storm cells in all three stages of growth and new cells can quickly form and grow in an area that a few minutes ago had been clear air. Thus, while weather radar systems that analyze weather radar returns and display present time tracking and trending of weather cells may provide valuable information, such tracking may not forecast weather phenomena that may develop at a future time, as the aircraft moves toward a volume of airspace in the planned flight path.

Figure 3B:
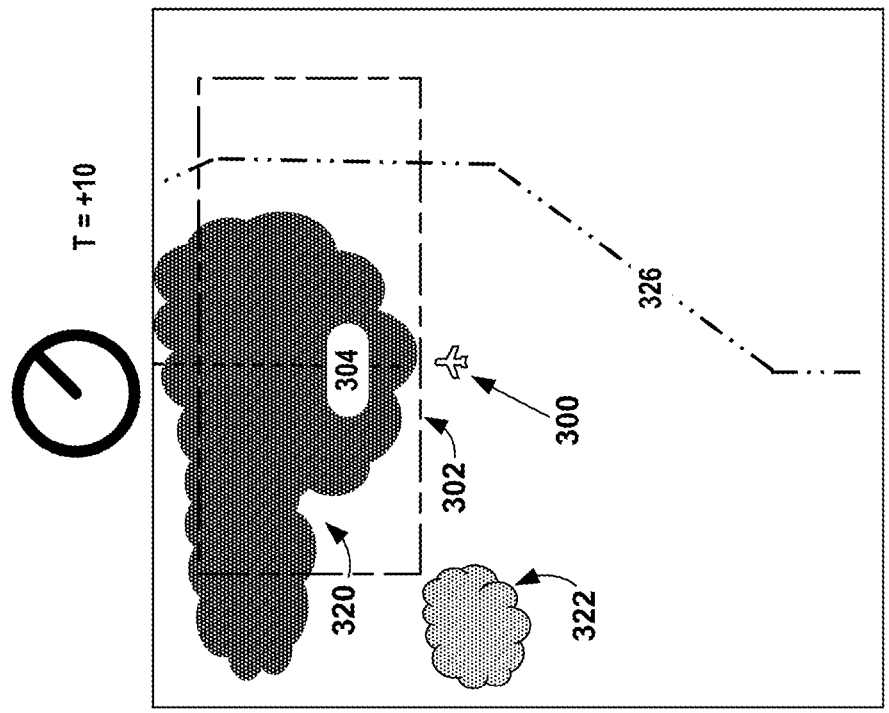
FIGS. 3A and 3B are conceptual diagrams illustrating an example operation of the near-term weather forecasting features of the weather radar system to provide suggested flight path changes, according to one or more techniques of this disclosure.
Figure 3A:
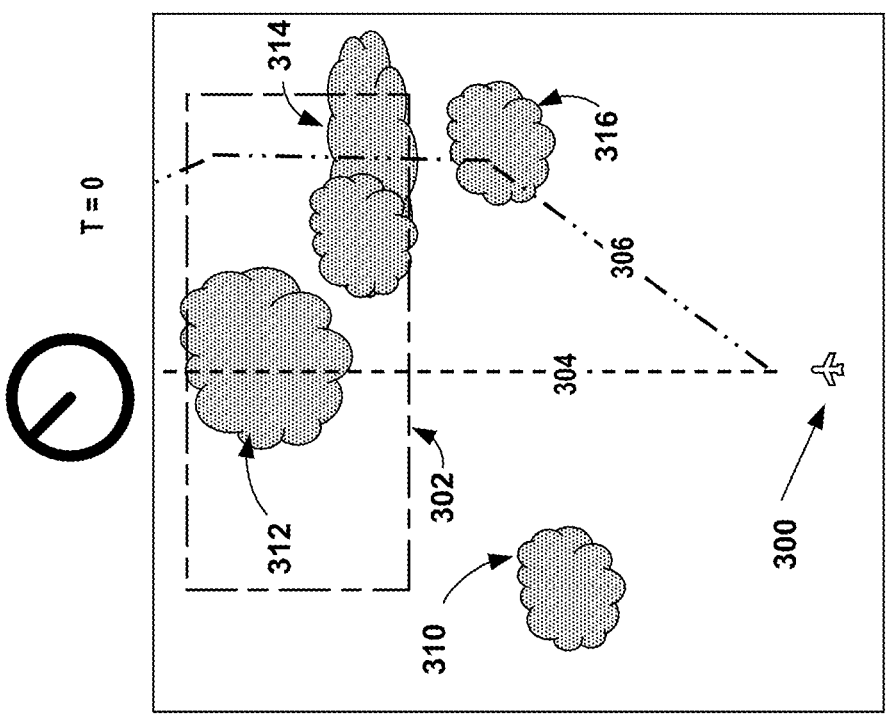

FIGS. 3A and 3B are conceptual diagrams illustrating an example operation of the near-term weather forecasting features of the weather radar system to provide suggested flight path changes, according to one or more techniques of this disclosure. FIG. 3A depicts an aircraft 300 and a present time (T=0) weather situation. FIG. 3B depicts aircraft 300 and a future weather situation ten minutes later (T=+10). In the example of FIGS. 3A and 3B, cumulus clouds mature into a possible thunderstorm with convective activity, as described above in relation to FIG. 2B.

In FIG. 3A. weather radar onboard aircraft 300 may detect clouds, or weather cells 310, 312, 316 and 316, based reflectivity of the weather cells associated with precipitation, as described above in relation to FIG. 1. Some of the weather phenomena may be located in a selected 3D volume of airspace 302. In some examples, the weather radar system may include weather cell tracking features that may show movement of any one or more of clouds 310, 312, 314 and 316, based on digitized three-dimensional (3D) radar reflectivity characteristics captured by several radar transmissions and reception of radar energy over time. The aircraft's flight path 304 at the present time (T=0), would take aircraft 300 through cloud 312 at some future point. An alternate flight path, 306 is not an obvious improvement in FIG. 3A, because the present time weather depiction shows flight path 306 also passing through possible weather cells 314 and 316.

However, in FIG. 3B, using a weather radar system of this disclosure, e.g., enhanced weather radar processing system 104 with weather forecast unit 106, may apply modeling techniques to stored data which may include 3D radar reflectivity characteristics collected for a volume 302 of airspace in the flight path of aircraft 300 over a period of time, e.g., approximately five to twenty minutes. With a user interface, e.g., a multi-function display, and EFB, or the weather radar graphical display device, the flight crew may select a future weather display, rather than a present time weather display. The weather radar system may generate and display forecasted weather changes to the volume 302 of airspace over a predetermined duration subsequent to the present time (T=0), such as T=+10, as shown in the example of FIG. 3B, or some other future time. In some examples, the size and location of volume 302, which is stored and analyzed in the memory, e.g., memory 124 of enhanced weather radar processing system 104 depicted in FIG. 1, may be adjusted by users of the weather radar system.

In the example of FIG. 3B, flight path 304 of aircraft 300 passes through a maturing weather cell 320, which may contain conditions hazardous to aircraft 300, as described above in relation to FIGS. 1, 2A and 2B. In some examples, processing circuitry onboard aircraft 300 may generate suggested flight path 326 based, at least in part, on the near-term forecasted weather, e.g., from weather forecast unit 106. Flight path 326 may avoid the maturing weather cell 320. In this manner, use of the weather forecasting techniques of this disclosure may provide improvements over the present time weather display of FIG. 3A, which may include present time predictions of hail, lightning, and other weather conditions. In addition to the present time predictions of weather conditions in a volume of airspace ahead of aircraft 300, the weather radar system of this disclosure may also display forecasted weather changes, which may include future 3D radar reflectivity, future composite radar information, and future hail size and so on for a predetermined short-term future duration, e.g., T=+10, T=+20 or some similar duration subsequent to the present time. The forecasts may be based in part on received reflected radar returns at the present time, which the weather radar system uses to develop the 3D radar reflectivity characteristics of the volume of airspace.

Figure 4:
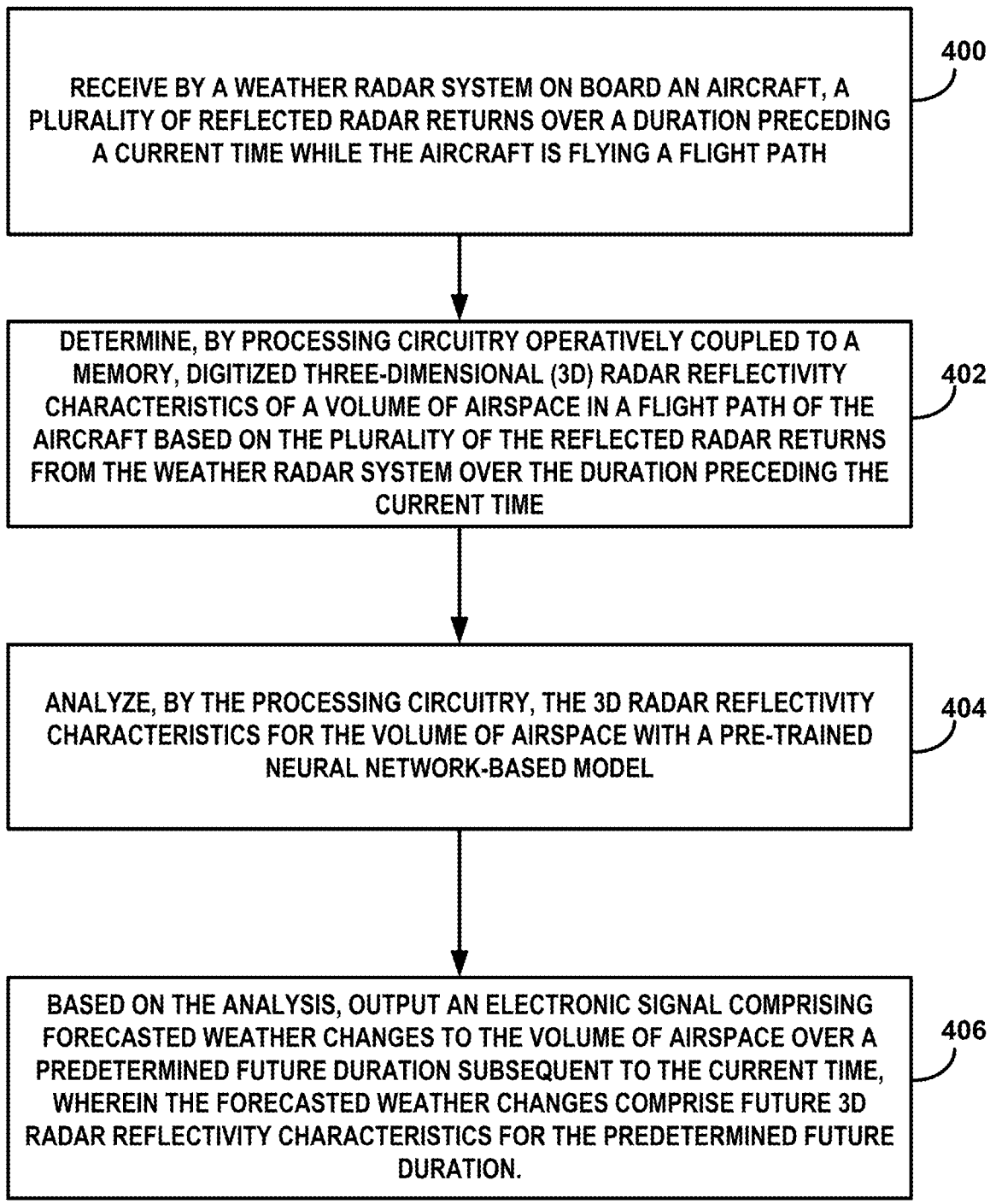
FIG. 4 is a flowchart illustrating an example operation of the weather radar system of this disclosure.

FIG. 4 is a flowchart illustrating an example operation of the weather radar system of this disclosure. The blocks of FIG. 4 will be described in terms of the components of FIG. 1, unless otherwise noted.

The processing circuitry of aircraft system 100 may receive a series of reflected radar returns from weather radar system 102 on board an aircraft, e.g., aircraft 300 depicted in FIG. 3A, over a duration preceding a current time while the aircraft is flying a flight path, e.g., flight path 304 (400). As described above in relation to FIG. 1, processing circuitry of aircraft system 100 may include processors 122 of enhanced weather radar processing system 104. In some examples, onboard weather radar system 102 may include processing circuitry that performs the functions of this disclosure, e.g., enhanced weather radar processing system 104 may be included as part of onboard weather radar system 102. In other examples, the functions of enhanced weather radar processing system 104 may be performed by an apparatus separate from onboard weather radar system 102.

In some examples, processing circuitry of aircraft system 100 may correlate reflected radar returns received over time by radar antenna 120 to positions in a 3D volume of airspace ahead of an aircraft to generate 3D volumetric weather data stored at a memory location, e.g., memory 124 and/or data storage 126. The 3D volumetric weather data may include digitized 3D radar reflectivity characteristics of the volume of airspace collected over time while the aircraft transits along a flight path through the volume of airspace, e.g., flight path 304 of aircraft 300 described above in relation to FIG. 3A. Radar antenna 120 may be a gimbal mounted radar antenna, phased array radar antenna, a multi-layer circuit board that includes an transmit and receive antenna layer and one or more layers that include transmitting circuitry and receiving circuitry, any combination of the above, or any other radar antenna configured for use on board an aircraft.

Processing circuitry of system 100 may determine digitized three-dimensional (3D) radar reflectivity characteristics of a volume of airspace, e.g., volume 302 in a flight path of the aircraft based on the plurality of the reflected radar returns from weather radar system 102 over the duration preceding the current time (402).

The processing circuitry may analyze the 3D radar reflectivity characteristics for the volume of airspace with a pre-trained neural network-based model, or similar machine learning technique (404). In addition to present time predicted ice crystal content, weather cell tracking and other functions, processors 122 may determine forecasted weather changes to the selected volume of airspace over a predetermined future duration subsequent to the present time. The forecasted weather changes may be based on analysis of the 3D volumetric weather data including the 3D radar reflectivity characteristics that may change over time. As described above in relation to FIG. 1, processors 122 may execute instructions stored, for example, at memory 124 to perform the analysis using various modeling techniques, including machine learning and other artificial intelligence techniques.

Based on the analysis, processors 122 may output an electronic signal comprising forecasted weather changes to the volume of airspace over a predetermined future duration subsequent to the current time, wherein the forecasted weather changes comprise future 3D radar reflectivity characteristics for the predetermined future duration. (406). The electronic signal may be received by a variety of equipment, including weather radar graphical display device 108, server 118, multi-function display 138, and so on. A flight crew member may manipulate a user interface associated with the equipment to display different aspects of the forecasted weather changes. For example, the user interface may be configured to receive input from the flight crew to switch between a present time view and a forecast view, as described above in relation to FIGS. 3A and 3B. In some examples the user interface of the equipment may be configured to select the future duration, e.g., a predetermined five-minute, ten-minute, twenty-minute future duration subsequent to the present time. As described above in relation to FIG. 1, the forecast features of this disclosure may be limited by the range of the radar, the speed of the aircraft and other factors.

In some examples, the electronic signal may include forecasted weather such as future 3D radar reflectivity, composite radar information, lightning, and hail size for the predetermined future duration. The user interface may be configured to filter, adjust, and otherwise manipulate the display to show and/or emphasize different information included in the electronic signal from processors 122. For example, the user interface may be configured to allow the flight crew to display future hail size forecast, but only for hail larger than a specified size and filter out other types of information contained in the electronic signal.

In one or more examples, the functions described above may be implemented in hardware, software, firmware, or any combination thereof. For example, the various components of FIGS. 1 and 2, such as processors 122, server 118 and onboard weather radar system 102 may be implemented in hardware, software, firmware, or any combination thereof. If implemented in software, the functions may be stored on or transmitted over, as one or more instructions or code, a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

The term "non-transitory" may indicate that the storage medium is not embodied in a carrier wave or a propagated signal. In certain examples, a non-transitory storage medium may store data that can, over time, change (e.g., in RAM or cache). By way of example, and not limitation, such computer-readable storage media, such as memory 124 and data storage 126 may include random access memory (RAM), read only memory (ROM), programmable read only memory (PROM), erasable programmable read only memory (EPROM), electronically erasable programmable read only memory (EEPROM), flash memory, a hard disk, a compact disc ROM (CD-ROM), a floppy disk, a cassette, magnetic media, optical media, or other computer readable media. In some examples, an article of manufacture may include one or more computer-readable storage media.

Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transient media, but are instead directed to non-transient, tangible storage media. Combinations of the above should also be included within the scope of computer-readable media.

Instructions may be executed by one or more processors, such as one or more DSPs, general purpose microprocessors, ASICs, FPGAs, or other equivalent integrated or discrete logic circuitry. Accordingly, the term "processor," as used herein, such as processors 122, may refer to any of the foregoing structure or any other structure suitable for implementation of the techniques described herein. Also, the techniques could be fully implemented in one or more circuits or logic elements.

The techniques of this disclosure may be implemented in a wide variety of devices or apparatuses, including, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a hardware unit or provided by a collection of interoperative hardware units, including one or more processors as described above, in conjunction with suitable software and/ or firmware.

The techniques of this disclosure may also be described in the following examples.

Example 1: A system comprising a weather radar system on board an aircraft configured to receive a plurality of reflected radar returns over a duration preceding a current time while the aircraft is flying a flight path; processing circuitry operatively coupled to a memory, the processing circuitry configured to: determine digitized three-dimensional (3D) radar reflectivity characteristics of a volume of airspace in a flight path of the aircraft based on the plurality of reflected radar returns over the duration preceding the current time; and analyze the 3D radar reflectivity characteristics for the volume of airspace with a pre-trained neural network-based model; and based on the analysis, output forecasted weather changes to the volume of airspace over a predetermined future duration subsequent to the current time, wherein the forecasted weather changes comprise future 3D radar reflectivity characteristics for the predetermined future duration.

Example 2: The system of example 1, wherein the predetermined future duration subsequent to the current time comprises a period of time prior to the aircraft arriving at the volume of airspace.

Example 3: The system of any of examples 1 and 2, wherein the weather radar system comprises the processing circuitry and the memory.

Example 4: The system of any of examples 1 through 3, wherein the processing circuitry is separate from the weather radar system.

Example 5: The system of any of examples 1 through 4, wherein the forecasted weather changes further comprise: future lightning probability, future hail size and future composite radar information.

Example 6: The system of any of examples 1 through 5, further comprising communication circuitry configured to receive off-board weather data, wherein to output the forecasted weather changes, the processing circuitry is further configured to analyze the off-board weather data.

Example 7: The system of any of examples 1 through 6, wherein the predetermined future duration is less than or equal to twenty minutes.

Example 8: A weather radar apparatus on board an aircraft, wherein the weather radar apparatus is configured to receive a plurality of reflected radar returns over a duration preceding a current time while the aircraft is flying a flight path, and the apparatus comprising: processing circuitry operatively coupled to a memory, the processing circuitry configured to: determine digitized three-dimensional (3D) radar reflectivity characteristics of a volume of airspace in the flight path of the aircraft based on the plurality of reflected radar returns over the duration preceding the current time analyze the 3D radar reflectivity characteristics for the volume of airspace with a pre-trained neural network-based model; and based on the analysis, output forecasted weather changes to the volume of airspace over a predetermined future duration subsequent to the current time, wherein the forecasted weather changes comprise future 3D radar reflectivity characteristics, for the predetermined future duration.

Example 9: The apparatus of example 8, wherein the forecasted weather information changes further comprise: future lightning probability, future hail size and future composite radar information.

Example 10: The apparatus of any of examples 8 and 9, wherein to output the forecasted weather changes, the processing circuitry is further configured to analyze off-board weather data.

Example 11: The apparatus of any of examples 8 through 10, wherein the predetermined future duration is less than or equal to twenty minutes.

Example 12: A method includes receiving, by a weather radar system on board an aircraft, a plurality of reflected radar returns over a duration preceding a current time while the aircraft is flying a flight path determining, by processing circuitry operatively coupled to a memory, digitized three-dimensional (3D) radar reflectivity characteristics of a volume of airspace in a flight path of the aircraft based on the plurality of the reflected radar returns from the weather radar system over the duration preceding the current time; analyzing, by the processing circuitry, the 3D radar reflectivity characteristics for the volume of airspace with a pre-trained neural network-based model; and based on the analysis, outputting an electronic signal comprising forecasted weather changes to the volume of airspace over a predetermined future duration subsequent to the current time, wherein the forecasted weather changes comprise future 3D radar reflectivity characteristics for the predetermined future duration.

Example 13: The method of example 12, wherein the predetermined future duration subsequent to the current time comprises a period of time prior to the aircraft arriving at the volume of airspace.

Example 14: The method of any of examples 12 and 13, wherein the weather radar method comprises the processing circuitry and the memory.

Example 15: The method of any of examples 12 through 14, wherein the processing circuitry is separate from the weather radar method.

Example 16: The method of any of examples 12 through 15, wherein the forecasted weather changes further comprise: future lightning probability, future hail size and future composite radar information.

Example 17: The method of any of examples 12 through 16, wherein to analyze the first digitized 3D radar reflectivity characteristics and the second digitized 3D radar reflectivity characteristics, the processing circuitry is configured to execute programming instructions that comprise operation of a neural network.

Example 18: The method of any of examples 12 through 17, further comprising communication circuitry configured to receive off-board weather data, wherein to output the forecasted weather changes, the processing circuitry is further configured to analyze the off-board weather data.

Example 19: The method of any of examples 12 through 18, wherein the predetermined future duration is less than or equal to twenty minutes.

Various examples of the disclosure have been described. These and other examples are within the scope of the following claims.

What is claimed is:

1. A system comprising:
a weather radar system configured to be mounted on board an aircraft and configured to receive a plurality of reflected radar returns for a field of regard over a duration preceding a current time while the aircraft is flying a flight path, wherein the field of regard includes at least a portion of the flight path; and
processing circuitry configured to be mounted on board the aircraft and operatively coupled to a memory, the processing circuitry configured to:
determine digitized three-dimensional (3D) radar reflectivity characteristics of a volume of airspace in the flight path of the aircraft based on the plurality of reflected radar returns over the duration preceding the current time;
analyze the 3D radar reflectivity characteristics for the volume of airspace with a trained neural network-based model to determine future 3D radar reflectivity characteristics for the volume of airspace in the flight path for a predetermined future duration subsequent to the current time, wherein the trained neural network-based model is trained based on historical 3D reflectivity data; and
output, to a display in the aircraft, a forecasted weather change to the volume of airspace over the predetermined future duration subsequent to the current time based on the future 3D radar reflectivity characteristics for the predetermined future duration.

2. The system of claim 1, wherein the predetermined future duration subsequent to the current time comprises a period of time prior to the aircraft arriving at the volume of airspace.

3. The system of claim 1, wherein the weather radar system comprises the processing circuitry and the memory.

4. The system of claim 1, wherein the processing circuitry is separate from the weather radar system.

5. The system of claim 1, wherein the forecasted weather change comprises one or more of a future lightning probability, a future hail size, or future composite radar information.

6. The system of claim 1, further comprising communication circuitry configured to receive weather data from a source other than the weather radar system, wherein to output the forecasted weather change, the processing circuitry is further configured to analyze the weather data.

7. The system of claim 1, wherein the predetermined future duration is less than or equal to twenty minutes.

8. A method comprising:
receiving, by a weather radar system on board an aircraft, a plurality of reflected radar returns for a field of regard over a duration preceding a current time while the aircraft is flying a flight path, wherein the field of regard includes at least a portion of the flight path;
determining, by processing circuitry on board the aircraft and operatively coupled to a memory, digitized three-dimensional (3D) radar reflectivity characteristics of a volume of airspace in the flight path of the aircraft based on the plurality of the reflected radar returns from the weather radar system over the duration preceding the current time;
analyzing, by the processing circuitry, the 3D radar reflectivity characteristics for the volume of airspace with a trained neural network-based model to determine future 3D radar reflectivity characteristics for the volume of airspace in the flight path for a predetermined future duration subsequent to the current time, wherein the trained neural network-based model is trained based on historical 3D reflectivity data; and
outputting an electronic signal comprising a forecasted weather change to the volume of airspace over the predetermined future duration subsequent to the current time based on the future 3D radar reflectivity characteristics for the predetermined future duration.

9. The method of claim 8, wherein the predetermined future duration subsequent to the current time comprises a period of time prior to the aircraft arriving at the volume of airspace.

10. The method of claim 8, wherein the weather radar system comprises the processing circuitry and the memory.

11. The method of claim 8, wherein the processing circuitry is separate from the weather radar system.

12. The method of claim 8, wherein the forecasted weather changes further comprise: future lightning probability, future hail size and future composite radar information.

13. The method of claim 8, further comprising:
receiving, by communication circuitry operatively coupled to the processing circuitry, weather data from a source other than the weather radar system,
analyzing, by the processing circuitry the weather data.

14. The method of claim 8, wherein the predetermined future duration is less than or equal to twenty minutes.

15. The system of claim 1,
wherein the processing circuitry is further configured to determine a stage for a thunderstorm in the volume of airspace, where in the stage is one of a growing stage, a mature stage, or a dissipating stage, and
wherein to output the forecasted weather change, the processing circuitry is configured to output an indication of the stage.

16. The system of claim 1, wherein the processing circuitry is further configured to:
determine an alternative flight path based on the forecasted weather change.

17. A weather radar system configured to be mounted on board an aircraft, the weather radar system comprising:
an antenna configured to receive a plurality of reflected radar returns for a field of regard over a duration preceding a current time while the aircraft is flying a flight path, wherein the field of regard includes at least a portion of the flight path;
a memory; and
processing circuitry operatively coupled to the memory and configured to:
determine digitized three-dimensional (3D) radar reflectivity characteristics of a volume of airspace in the flight path of the aircraft based on the plurality of reflected radar returns over the duration preceding the current time;
analyze the 3D radar reflectivity characteristics for the volume of airspace with a trained neural network-based model to determine future 3D radar reflectivity characteristics for the volume of airspace in the flight path for a predetermined future duration subsequent to the current time, wherein the trained neural network-based model is trained based on historical 3D reflectivity data; and output a forecasted weather change to the volume of airspace over the predetermined future duration subsequent to the current time based on the future 3D radar reflectivity characteristics for the predetermined future duration.

18. The weather radar system of claim 17,
wherein the processing circuitry is further configured to determine a stage for a thunderstorm in the volume of airspace, wherein the stage is one of a growing stage, a mature stage, or a dissipating stage, and
wherein to output the forecasted weather change, the processing circuitry is configured to output an indication of the stage.

19. The weather radar system of claim 17, further comprising:
a tablet computer comprising at least a portion of the processing circuitry.

* * * * *